Aug. 28, 1951 P. GIUFFRIDA 2,566,187
MOVIE PROJECTOR SAFETY SWITCH
Filed Nov. 1, 1946
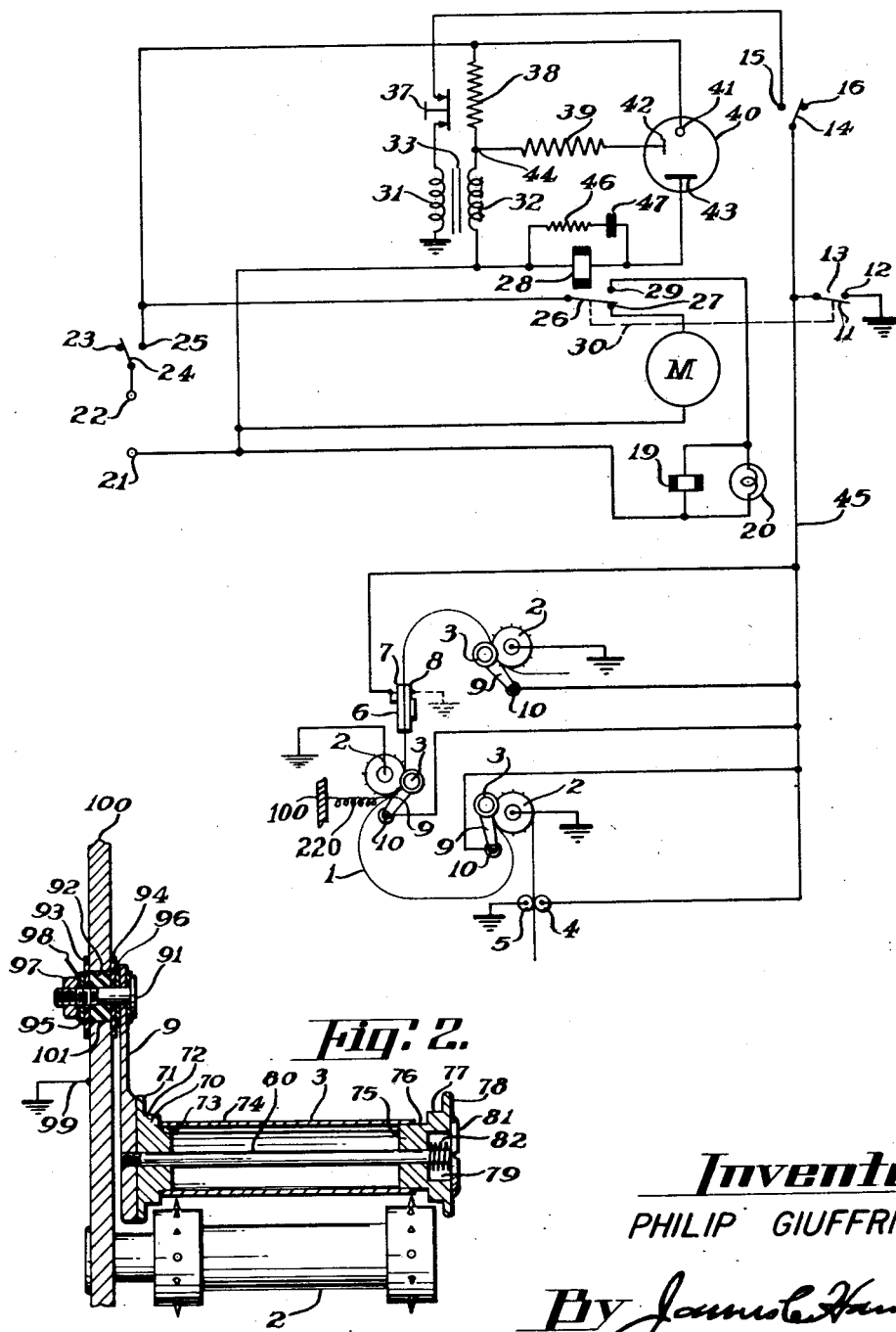
Inventor
PHILIP GIUFFRIDA
By James C. Hamilton
Attorney Patented Aug. 28, 1951

2,566,187

UNITED STATES PATENT OFFICE 2,566,187

MOVIE PROJECTOR SAFETY SWITCH

Philip Giuffrida, Lawrence, Mass., assignor to Photoswitch, Incorporated, Cambridge, Mass., a corporation of Massachusetts Application November 1, 1946, Serial No. 707,107

6 Claims. (Cl. 200—52)

This invention relates generally to safety devices, and more particularly to such devices as are used in motion picture projection machines for the purpose, among others, of eliminating fire hazards inherent when inflammable films are used in projectors having very powerful sources of light.

If in the operation of a movie projector the film should stop, or break in such a way that pieces of film remain still in the strong beam of light in the gate of the projector, the film will very quickly catch fire and may result in a dangerous explosion. Generally this inherent danger may be minimized by requiring the constant attendance of the operator, so that he may stop the projector if it is not operating properly. Although a number of automatic safety devices have been made with a view to minimizing the fire hazard, such devices have all increased the number of operations required to thread the film through the projector, and have not come into common use because the inconvenience caused to the operator, especially a professional operator in a theatre, has far outweighed the convenience provided by the automatic safety device. This invention provides an automatic safety device for supervising the film in a projector which avoids increasing the number of operations in threading the film by reason of its utilization of the standard structure of the projector and modifying certain parts of that structure to accomplish the result desired without interfering with the standard operational technique.

The principal object of the invention is to provide a new and improved, simple, yet positively operating safety device for supervising the operation of a movie projector which does not require additional operations of the operator in threading the film.

Another object of the invention is to provide a novel device for supervising the operation of a movie projector which is adapted for installation on standard types of projectors with but slight and simple modification of the component parts thereof.

A further object of the invention is to provide a novel safety device suitable upon breakage of the moving film in a movie projector for triggering an electronic relay.

A further object is to provide a novel arrangement using modified standard projector parts for controlling the operation of a movie projector in response to the breakage of the film therein.

These and other and further objects will be more readily understood from a reading of the following description, which is accompanied by drawings, wherein:

Fig. 1 illustrates in electrical and mechanical scheme a typical operating installation employing the invention; and Fig. 2 illustrates a guide roller switch of Fig. 1 in greater detail, the guide roller being illustrated in longitudinal section to show its construction.

The invention consists in general of a switch incorporated into one of the operating mechanisms of the projector and suitable for operating an electronic relay upon film breakage. The relay initiates certain safety operations such as opening the motor circuit, applying a brake to the flywheel of the projector and placing a safety shutter in the path of the light entering the film gate of the projection mechanism.

Certain of the features here disclosed are claimed in the inventor's co-pending application, Serial Number 32,193, filed June 10, 1948.

Fig. 1 illustrates an installation of the invention, with only those parts of the projector mechanism shown which directly cooperate in the operation of the invention. The projector body, lenses, light sources, shutter, and operating mechanism have been omitted as not being pertinent. The parts of the projector which are shown in Fig. 1 are variously modified, as will be explained below, to perform the additional function of electric switches while at the same time retaining their original character as projector parts. These modified standard components are shown in the bottom part of Fig. 1 in approximately the same configuration as such components would be found in a standard movie projector.

As in any standard projector, the movie film 1 is moved along its path by sprocket wheels 2 with guide rollers 3, said guide rollers being mounted on one end of each of crank arms 9, the other ends of said arms 9 being mounted at 10 on the projection mechanism housing (not shown), and being electrically insulated therefrom as will be hereinafter explained. The crank arms 9 are customarily attached to a restraining spring 220, here schematically illustrated as attached to some part of the projector frame 100, for holding the guide rollers 3 adjacent to the sprocket wheels 2 and thereby tending to hold the film 1 in engagement with the sprocket wheels 2. Each guide roller 3 and sprocket wheel 2 combination constitutes an electrical switching device, as shown in greater detail in and described with respect to Fig. 2. The sprocket wheels 2 are grounded to the frame of the projector (Fig. 2) and the guide rollers 3 are connected in parallel through the respective crank arms 9 to a common wire 45.

The gate may also be an electrical switch of the type illustrated, for example, in the inventor's co-pending application, Serial No. 184,149, filed September 11, 1950. The gate switch 6 is here illustrated schematically as comprising two contacts 7 and 8, held apart by the film.

The guide rollers 4 and 5, between which the film 1 passes in leaving the projector mechanism, may form another switching device with roller 5 connected to ground and roller 4 connected to wire 45 also in parallel with the rollers 3. These rollers may be of a standard type, with roller 4 insulated by standard methods from the projector housing (not shown) and urged by light spring means (not shown) into electrical contact with each other but held from such contact by the film 1 when it is passing therebetween. Alternatively, roller 4 may be of construction similar to guide roller 3 as described below with reference to Fig. 2.

Wire 45 leads to a glow discharge tube electronic relay of the type described in the United States Patent No. 2,352,240 to Wolfner, dated June 27, 1944, comprising a glow discharge tube 40 of which the cathode 41 is connected through an appropriate power control switch 23 to a supply terminal 21. The anode 43 is connected through an electromagnet 28 to the other supply terminal 21. The starting electrode 42 is connected through a resistor 39 to a point 44 on a voltage divider network connecting a resistor 38 and a primary winding 32 of a transformer 33 connected in series with point 44 between them, and with resistance 38 connected to the cathode 41 and the primary winding 32 to the anode supply terminal 21. The secondary winding 31 of transformer 33 is connected at one side through a normally closed push button test switch 37 and through a unit control switch 16 to wire 45, and at the other side to ground. A condenser 47 and a resistor 46 are connected in series across the electromagnet 28.

Electromagnet 28 operates a single-pole double-throw relay switch 30 having two contacts 27 and 29, and a switch armature 26. The operating motor M for the projector is connected between contact 27 and supply terminal 21. The switch armature 26 is connected through power switch 23 to the other supply terminal 22. A latching relay switch 13 is linked to switch armature 26 and has a switch blade 11 connected to wire 45 which is closed on grounded contact 12 when switch armature 26 is closed on contact 29.

A solenoid 19 for operating a brake and other safety devices (not shown) is connected between supply terminal 21 and switch contact 29, and has connected in parallel thereto a warning light 20.

The apparatus according to Fig. 1 is placed in operating condition by threading the film 1, as in a standard movie projector, through the sprocket wheels 2 and guide rollers 3, film gate 6, and guide rollers 4 and 5, the film when threaded holding apart the switch contacts of guide rollers 3 and sprocket wheels 2 and film gate 6, as explained in detail below with respect to Fig. 2, as well as rollers 4 and 5. The unit switch 16 is closed, the latching switch 13 is normally open, and push button test switch 37 is normally closed. Normally, the electromagnet 28 is deenergized (as will be explained below) and armature 26 is positioned against contact 27. To start operation the switch 23 is closed, causing power to be supplied to the motor M through circuit 22—24—25—26—27—M—21, and causing the power source at terminals 22 and 21 to be impressed on the anode 43 and cathode 41 of tube 40 through electromagnet 28 and on the voltage divider network consisting of resistor 38 and transformer primary 32. Since the secondary winding 31 of the transformer 33 is connected in circuit ground—31—37—15—14—45—10—9—2—ground which is held open by the presence of the film 1 between guide roller 3 and sprocket wheel 2, the circuit of the secondary winding is open, and the impedance of the primary 32 is relatively high. The resistance 38 is of such value that under this condition the potential at point 44, which is impressed on starting electrode 42, is such that the tube 40 is non-conductive, so that no current flows through electromagnet 28. Thus the switch armature 26 is left in its normal position connecting the projector motor M to the power source.

If during the operation of the projector the film 1 should break, permitting any one of the parallel connected switches to close the circuit ground—31—37—15—14—45—10—9—2—ground, (or the equivalent circuit through the gate 6 or rollers 4—5) the low impedance of the now closed circuit of the secondary winding 31 would be reflected through transformer 33 to the primary 32, permitting the potential at point 44 and, consequently, of the starting electrode 42 to increase beyond the starting point determined by the characteristics of tube 40, and causing current to flow through tube 40 and through electromagnet 28. The electromagnet 28 immediately pulls switch armature 26 from contact 27 to contact 29, breaking the supply of power to the projector motor M and closing circuit 22—24—25—26—29—19—21, causing power to flow through solenoid 19, to operate any desired type of safety device (not shown) such as, for example, a mechanical brake on the flywheel of the projector mechanism and a safety shutter to interrupt the light entering the film gate in the projector mechanism.

Also, when electromagnet 28 is energized, it closes the latching switch 13 so as to connect wire 45 to ground. Since the latching switch 13 is connected in parallel to the switches in the projector, it serves to hold the projector inoperative once it has been stopped, as explained above, by film breakage.

From the foregoing description it is clear that it is immaterial to the operation of the apparatus how many switching devices are located along the path of the film 1, since the operations of any one or more of the switches will trigger the tube 40. It is desirable, however, to locate a plurality of switches variously throughout the projector, the more quickly to detect film breakage.

The normally closed push button switch 37 may be used to open momentarily the shorted circuit containing the transformer secondary winding 31, in order to stop the discharge through tube 40 and to render the projector operative momentarily, to feed film for rethreading, or to test the safety system for a defective discharge tube 40.

After the film is rethreaded in order to restart the projector, the normally closed push button switch is opened momentarily to reset the electronic relay.

Referring now to Fig. 2, there is shown in detail a safety switch comprising the modified guide roller 3 and sprocket wheel 2. The guide roller 3 includes the end piece 70, having a flange 71, a step 72 to hold the film, and a lower step 73 to hold the cylindrical body 74 of the roller. At the other end of the roller is end piece 75, having a lower step 76 which has a sliding fit within the body 74, a higher step 77 like step 72 to hold the film, and a flange 78. A recess 79 in end 75 is provided. End pieces 70 and 75 revolve about an axle 80, one end of which is attached to crank arm 9, the other end having a flanged portion 81. In the recess 79 of end 75 is a coil spring 82 around the axle 80, which tends to force end 75 away from flange 81 toward body 74 and the opposite end piece 70.

The other end of crank arm 9 is pivotally mounted on the housing 100 of the projector, in the same manner as in a standard projector except that it is insulated therefrom. The mounting bolt 91 passes through an insulating bushing 92 in a hole 101 in the housing 100, with insulating washers 93 and 94 on each side thereof next to the housing 100 under metal washers 95 and 96, and has a holding nut 97 to hold the entire assembly together. Connection for wire 45 of Fig. 1 is made to a lug 98 mounted just under nut 97. Sprocket wheel 2 is mounted as is customarily done in any standard movie projector to the housing 100, it being necessary only to make certain that there is a good electrical contact between the parts of the sprocket wheel and the housing 100, which is grounded by wire 99.

The switch of Fig. 2 operates as follows: The film 1 (not shown in Fig. 2) passes over sprocket wheel 2 with the guide roller 3 holding it under the urging of the aforementioned spring tension of arm 9 with one edge of the film in engagement with flange 71 and the other edge with flange 78, the film thereby holding movable end 75 outward toward the flange 81, and placing the spring 82 under compression. The movable end 75 of the split guide roller 3 is in this manner held away from the sprocket wheel 2 by the film.

When the film breaks or leaves the sprocket wheel 2 and guide roller 3, the movable end 75 of the roller 3 is no longer held away from sprocket wheel 2; the spring 82 pushes movable end 75 toward fixed end 70 until flange 78 hits sprocket wheel 2, thereby completing an electrical circuit 98—91—9—80—75—2—100—99—ground.

Since many changes not herein specifically referred to may be made in the above-described article and different embodiments of the invention could be made without departing from the scope thereof, it is intended that all matters contained in the above description or shown in the accompanying drawings shall be interpreted as illustrative only and not in a limiting sense.

What is claimed:

1. An electrical switch for supervising the passage of film in a motion picture projector comprising: a film sprocket wheel having a fixed mounting and electrical contact with said mounting; a crank arm having one end attached to an insulated mounting fixed in relation to said wheel and on the other end a film guide roller having first and second flanges, said first flange being electrically conductive and being resiliently mounted and urged toward said second flange by a first spring means; a second spring means tending to urge said guide roller toward said sprocket wheel, said film when disposed between said guide roller and said sprocket wheel being adapted to maintain said first flange from contact with said sprocket wheel, and said first flange establishing electrical contact between said guide roller and sprocket wheel in the absence of said film.

2. An electric switch for supervising the passage of film in a motion picture projector comprising: an electrically conductive film sprocket wheel having sprocket teeth for driving the film; a film guide roller, an electrically conductive flange of larger diameter than said roller mounted on said roller and slidable along its axis, said flange having a reduced neck portion, also of larger diameter than said roller, adapted to engage said wheel outside said teeth; and a spring for urging said flange into electrical contact with said wheel, said film preventing said contact when disposed between said wheel and guide roller.

3. A switch according to claim 2 having a stud mounted coaxially in said roller and terminating in a retaining head, said flange being slidably mounted on said stud and having a recess in its outer face, and said spring being mounted in said recess between said flange and said head.

4. An electric switch for supervising the passage of film in a motion picture projector comprising: an electrically conductive sprocket wheel having sprocket teeth for driving said film; a fixed electrically conductive mounting for said wheel; an insulating bushing secured to said mounting; a shaft mounted in said bushing; a crank arm mounted on said shaft; a film guide roller mounted on the free end of said crank arm; a spring adapted to urge said roller into engagement with said wheel; an electrically conductive flange mounted on said roller and slidable along its axis; and a second spring adapted to urge said flange into electrical contact with said wheel, said film preventing said contact when disposed between said wheel and guide roller.

5. A switch according to claim 4, said flange being of larger diameter than said roller and having a reduced neck portion, also of larger diameter than said roller, adapted to engage said wheel outside said teeth.

6. A switch according to claim 4 having a stud mounted coaxially in said roller and terminating in a retaining head, said flange being slidably mounted on said stud and having a recess in its outer face, and said spring being mounted in said recess between said flange and said head.

PHILIP GIUFFRIDA.

REFERENCES CITED

The following references are of record in the file of this patent:

UNITED STATES PATENTS

| Number | Name | Date |
| --- | --- | --- |
| 1,084,651 | McFeely | Jan. 20, 1914 |
| 1,261,029 | Hulsey et al. | Apr. 2, 1918 |
| 1,476,006 | Phimister | Dec. 4, 1923 |
| 1,738,999 | Jeanes et al. | Dec. 10, 1929 |
| 1,842,658 | Cohen et al. | Jan. 26, 1932 |
| 1,988,980 | Debrie | Jan. 22, 1935 |
| 2,016,506 | Maluss et al. | Oct. 8, 1935 |
| 2,104,952 | Saelens et al. | Jan. 11, 1938 |
| 2,447,238 | Edmondson | Aug. 17, 1948 |

FOREIGN PATENTS

| Number | Country | Date |
| --- | --- | --- |
| 168,723 | Great Britain | Sept. 15, 1921 |
| 424,220 | Great Britain | Feb. 18, 1935 |
| 599,001 | Germany | June 27, 1934 |